s008189755B2

United States Patent
Winikoff et al.

(10) Patent No.: US 8,189,755 B2
(45) Date of Patent: May 29, 2012

(54) CALL URGENCY SCREENING

(75) Inventors: Dave Winikoff, Menlo Park, CA (US);
Saravanakumar Tiruthani, Cupertino, CA (US); Wolfgang Scheinhart, Antioch, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1190 days.

(21) Appl. No.: 11/522,046

(22) Filed: Sep. 14, 2006

(65) Prior Publication Data

US 2007/0172042 A1    Jul. 26, 2007

Related U.S. Application Data

(60) Provisional application No. 60/761,691, filed on Jan. 23, 2006.

(51) Int. Cl.
    *H04M 3/42*    (2006.01)
(52) U.S. Cl. .................. 379/201.1; 379/142.06
(58) Field of Classification Search .......... 379/142.04–142.06, 201.02, 215.01, 379/201.1
    See application file for complete search history.

(56) References Cited

U.S. PATENT DOCUMENTS

| | | | | |
|---|---|---|---|---|
| 5,329,578 A * | 7/1994 | Brennan et al. | .......... | 379/211.03 |
| 5,588,037 A * | 12/1996 | Fuller et al. | .............. | 379/211.02 |
| 5,625,680 A * | 4/1997 | Foladare et al. | .............. | 379/199 |
| 5,636,269 A * | 6/1997 | Eisdorfer | .................. | 379/215.01 |
| 5,684,867 A * | 11/1997 | Gesslein et al. | .......... | 379/114.14 |
| 6,005,870 A * | 12/1999 | Leung et al. | .................. | 370/466 |
| 6,041,103 A * | 3/2000 | La Porta et al. | .............. | 379/67.1 |
| 6,175,616 B1 * | 1/2001 | Light et al. | .................. | 379/88.14 |
| 6,771,639 B1 * | 8/2004 | Holden | .......................... | 370/352 |
| 7,684,434 B2 * | 3/2010 | Shaffer et al. | .................. | 370/463 |
| 7,688,958 B2 * | 3/2010 | Dolan et al. | ............. | 379/142.02 |
| 2005/0243982 A1 * | 11/2005 | Starbuck et al. | ........... | 379/88.23 |
| 2006/0025114 A1 | 2/2006 | Bales et al. | | |
| 2007/0081636 A1 * | 4/2007 | Shaffer et al. | .................... | 379/80 |

* cited by examiner

*Primary Examiner* — Simon Sing
*Assistant Examiner* — Assad Mohammed (57) ABSTRACT

In some embodiments, a call urgency screening system may include one or more of the following features: (a) a data storage device comprising, (i) a call urgency screening program that allows a recipient to choose whether to accept a call from a caller or offer to the caller other alternate call handling of the call based on interaction with the caller and a dialog engine, and (b) a processor coupled to the data storage device that executes the call urgency screening program.

20 Claims, 6 Drawing Sheets

CALL URGENCY SCREENING

CROSS REFERENCE TO RELATED APPLICATIONS

This application is based on U.S. Provisional Application No. 60/761,691, filed on Jan. 23, 2006, titled Urgency Based Call Screening and claims the benefit thereof for priority purposes and is incorporated herein by reference in its entirety.

FIELD OF THE INVENTION

This invention relates to telecommunications systems. In particular, this invention relates to call routing systems. More particularly, this invention relates to the use of presence based communication systems that notify a recipient in real time the importance of a call and enables the intelligent routing of the incoming call.

BACKGROUND OF THE INVENTION

Presence-based communications applications are entering the mainstream telecommunications environment. In such applications, a user maintains one or more "contact lists" of other parties whose presence status is to be monitored and displayed to the user. If the other party is determined to be "present", the user's contact list will display the available status. The user can then contact the other party for example via a telephone call.

The existing presence based real-time communication systems allow users to determine how and where to receive incoming calls. The users specify the rules based on the caller, time of day, etc. The users can also specify e-mail routing rules based on the subject of the e-mail, urgency of the e-mail etc. The use of subject and urgency for e-mails provides a mechanism for the sender's of the e-mails to indicate the importance of the message. Presently, presence based communication systems do not allow for a user under certain circumstances (like during a meeting they might be in) to be able to control their availability in a more selective way other than just through a presence indication.

Therefore, it is desirable to have a system that identifies the importance of calls and based upon that importance the call is routed to the appropriate destination.

SUMMARY OF THE INVENTION

These and other drawbacks in the prior art are overcome in large part by a system and method according to embodiments of the present invention.

In some embodiments, a call urgency screening system may include one or more of the following features: (a) a data storage device comprising, (i) a call urgency screening program that allows a recipient to choose whether to accept a call from a caller based on interaction with the caller and a dialog engine, and (b) a processor coupled to the data storage device that executes the call urgency screening program.

In some embodiments, a method for call urgency screening may include one or more of the following steps: (a) placing a call, (b) interacting with a virtual assistant to determine importance of the call, (c) determining if a caller should be routed to a recipient based upon importance of the call, (d) receiving call urgency rule data and call handling options offered by the virtual assistant, (e) determining the importance of the call, (f) transferring the call to the recipient if it is determined that the call should be routed to the recipient or offer alternate call handling options to the caller in case the user decides not to receive the call, (g) transferring the call to voicemail if it is determined that the call should not be routed to the recipient, and (h) transferring the call to voicemail if the caller does not met initial rule criteria or offer alternate call handling methods to the caller in case the user decides not to receive the call.

In some embodiments, a machine readable medium comprising machine executable instructions may include one or more of the following features: (a) rule instructions that set caller urgency parameters for an incoming call, (b) dialog instructions that obtain call importance information from a caller, (c) delivery instructions that route the incoming call based upon recipient instructions.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention take presence based communication to next level by allowing a caller to engage in a dialogue with the recipient's automated agent or even the recipient before routing the call to the appropriate destination for a detailed conversation. During this dialogue, the caller can specify the urgency of the call and based on the urgency perceived by the recipient the call can further be routed to appropriate device or person.

Embodiments of the present invention disclose a scheme through which the importance of the calls is ascertained by a combination of intelligent dialog with an automated agent and in some cases even with the recipient through alternative media. Once the importance and the urgency of the call is determined, the call can be routed to the appropriate destination. In addition, a way for the presence state communicated for an individual can be set to different values for specific recipients of that presence information is disclosed.

Depending on the specific contact and the urgency of their matter the user may want to be able to accept a call from a selected list of contacts when they have an urgent matter even though the user may want to appear to other contacts as "unavailable" and in general does not want to be interrupted. The user may further want to have the ability to screen the urgency and be able to determine whether to accept the interruption or ignore it and allow the caller other real-time presence based options to handle the call. The user may want the handling of the call to be user definable via rules for example based on contact, presence information, location, time zone, device/media capability, keyword, availability of delegates etc.

Figure 1:
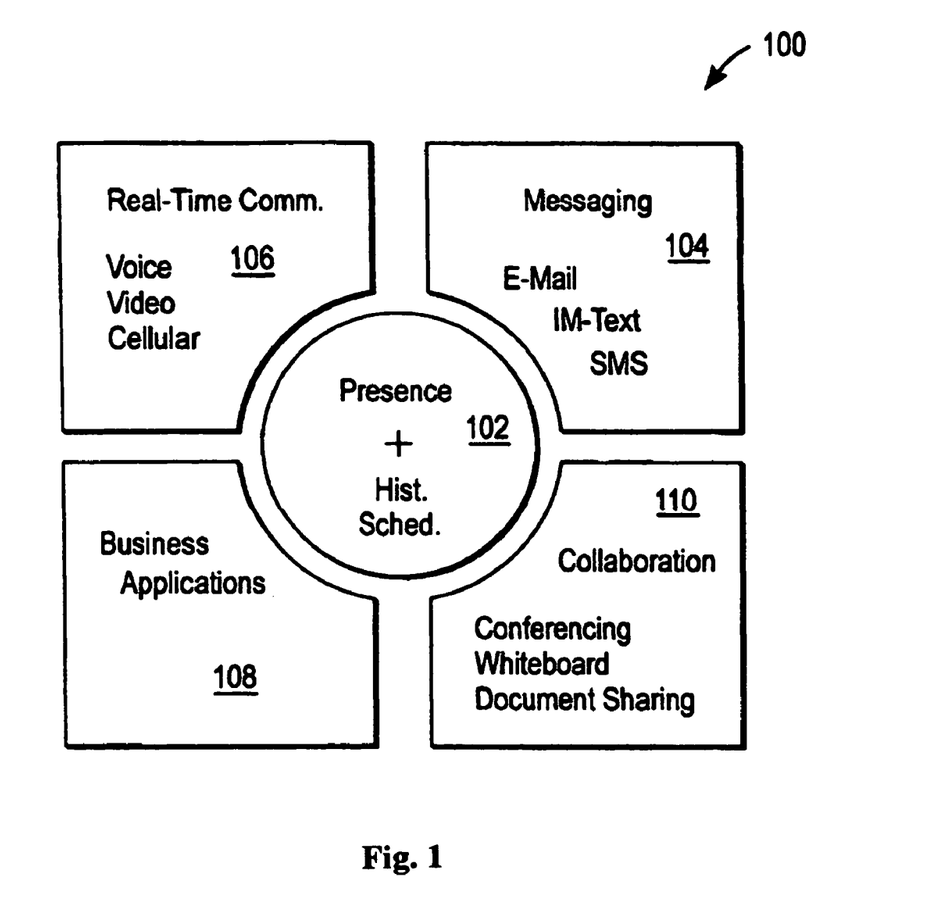
FIG. 1 illustrates a multi-modal presence system according to embodiments of the present invention.

Turning now to the drawings and with particular attention to FIG. 1, a diagram schematically illustrating a multi-modal presence-based telecommunications system 100 according to an embodiment of the present invention is shown. The telecommunications system 100 includes real-time communication capabilities 106, messaging capabilities 104, network business applications 108, and collaboration applications 110. Real-time communication 106 can include, for example, voice, video, or cellular. Messaging 104 includes e-mail, instant messaging, short messaging service (SMS) or other text-based services. Business applications 108 can include, for example, Customer Relationship Management (CRM) and Enterprise Resource Planning (ERP) software packages. Collaboration applications 110 can include conferencing, whiteboarding, and document sharing applications.

In addition, a multi-modal presence feature 102 according to embodiments of the present invention can provide presence services, including history, and scheduling information, aggregated across the various media 104, 106, 108, and 110.

It is noted that while illustrated as a multi-modal presence system, embodiments of the present invention are equally applicable to system employing only single presence-based media. Thus, the figures are exemplary only.

Figure 2:
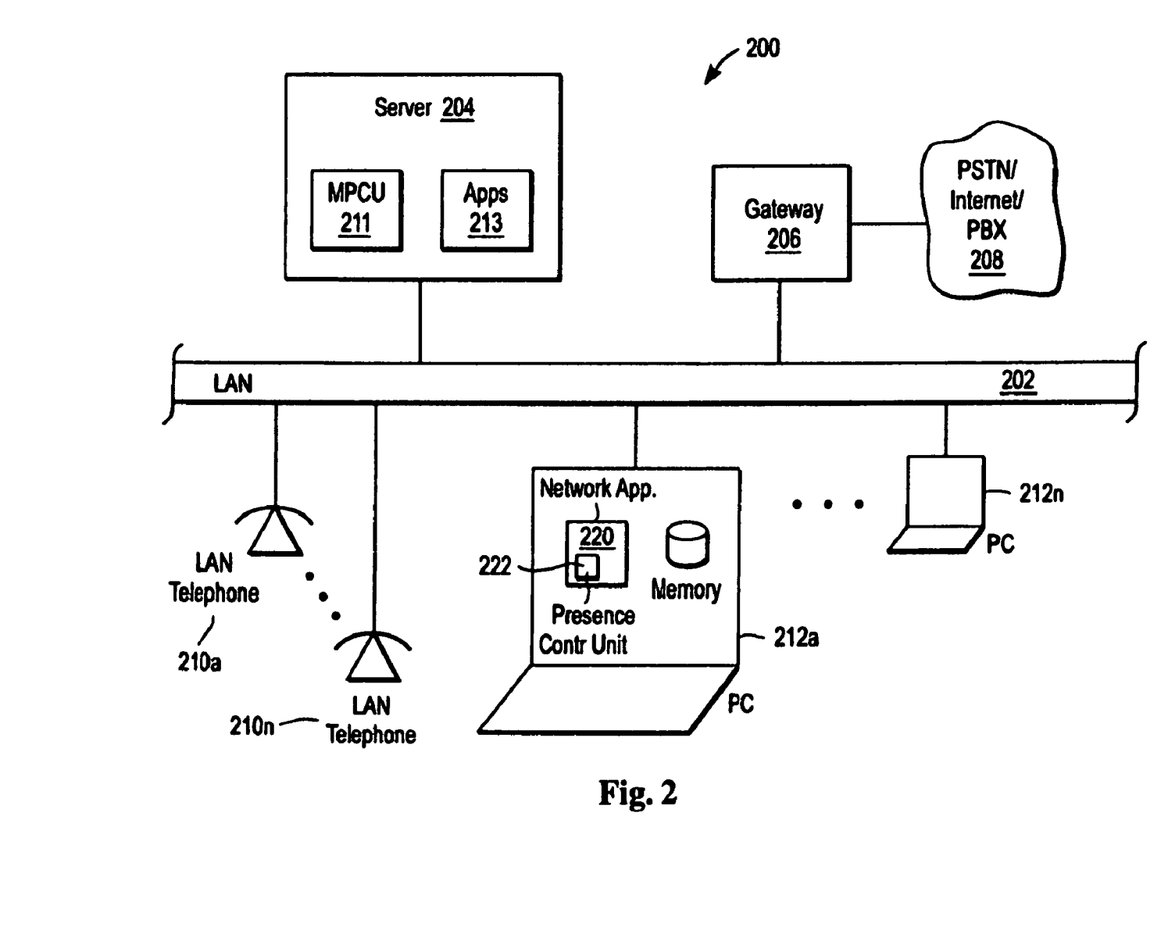
FIG. 2 is a block diagram of a telecommunications system according to an embodiment of the present invention.

FIG. 2 illustrates an exemplary enterprise network 200 including a presence system in accordance with embodiments of the present invention. It is noted that, while a particular network configuration is shown, the invention is not limited to the specific embodiment illustrated. As shown, the enterprise network 200 includes a local area network (LAN) 202. The LAN 202 may be implemented using a TCP/IP network and may implement voice or multimedia over IP using, for example, the Session Initiation Protocol (SIP) or ITU Recommendation H.323. Coupled to the local area network 202 is a multimedia enterprise or presence server 204.

The server 204 may include one or more controllers (not shown), such as one or more microprocessors, and memory for storing application programs and data. Server 204 may provide a variety of services to various associated client devices, including computers, telephones, personal digital assistants, text messaging units, and the like. Thus, as will be explained in greater detail below, the server 204 may implement a suite of applications 213 as well as, or including, a master presence control unit 211, according to embodiments of the present invention.

Also coupled to the LAN 202 is a gateway 206 which may be implemented as a gateway to a private branch exchange (PBX), the public switched telephone network (PSTN) 208, or any of a variety of other networks, such as a wireless, PCS, a cellular network, or the Internet. In addition, one or more client endpoints such as LAN or IP telephones 210a-210n or one or more computers 212a-212n may be operably coupled to the LAN 202.

The computers 212a-212n may be personal computers implementing the Windows XP™ operating system and thus, running Windows Messenger™ client (it is noted, however, that other Instant Messaging Programs could be implemented.) In addition, the computers 212a-212n may include telephony and other multimedia messaging capabilities using, for example, peripheral cameras, microphones and speakers (not shown) or peripheral telephony handsets. In other embodiments, one or more of the computers may be implemented as wireless telephones, digital telephones, or personal digital assistants (PDAs). Thus, the figures are exemplary only. The computers 212a-212n may include one or more processors, such as Pentium™-type microprocessors, and storage for applications and other programs. The computers 212a-212n may implement network application programs 220 including one or more presence control units 222 in accordance with embodiments of the present invention. In operation the presence control units 222 allow the client endpoints to interact with the presence service(s) provided by the presence server 204.

Figure 3:
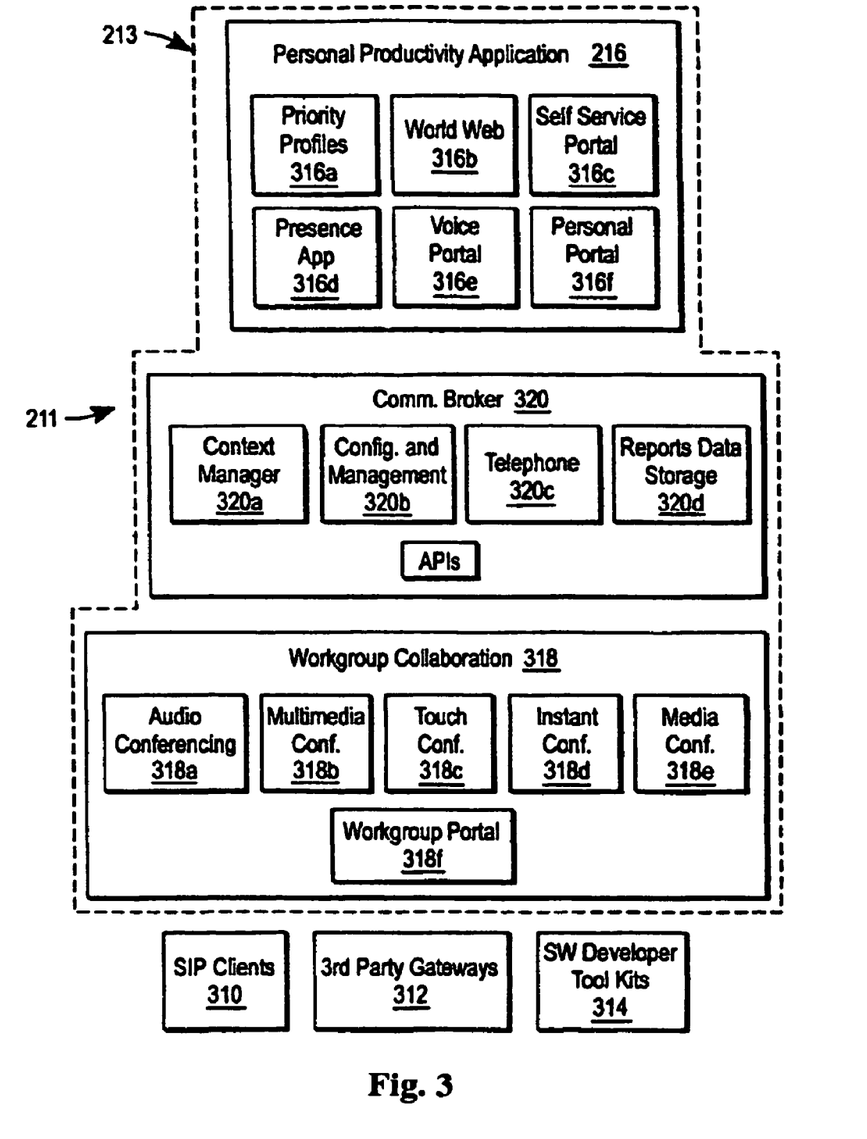
FIG. 3 is a block diagram of a multimedia server according to embodiments of the present invention.

Turning now to FIG. 3, a block diagram illustrating a server 204 according to embodiments of the invention is shown. As shown, the server 204 implements a master presence control unit 211 and a server application suite 213. In the embodiment illustrated, the multimedia server 204 also provides interfaces, such as application programming interfaces (APIs) to IP phones/clients 310, gateways 312, and software developer toolkits 314. An exemplary server environment capable of being adapted for use in a system according to embodiments of the present invention is the OpenScape™ system, available from Siemens Information and Communication Networks™, Inc. Such an environment can be implemented, for example, in conjunction with Windows Server, Microsoft Office Live Communications Server, Microsoft Active Directory, Microsoft Exchange and SQL Server. It is noted that the various control units discussed herein may be implemented as any suitable hardware, firmware, and software, or any combinations thereof.

Master presence control unit 211 collectively includes one or more presence applications 316c, and a context manager 320a. In certain embodiments, personal profiles 316a interface to the master presence control unit 211, as well, and may be considered part of it. Thus, the master presence control unit 211 interfaces to productivity applications to provide presence services according to embodiments of the present invention.

In the embodiment illustrated, the application suite 213 includes a personal productivity application 316, a workgroup application 318, and a communication broker 320. The personal productivity application 316 implements various application modules: priority profiles 316a, word web 316b, presence 316c, voice portal 316d, self-service portal 316e, and personal portal 316f. The workgroup collaboration application 318 implements audio conferencing 318a, multimedia conferencing 318b, touch conferencing 318c, instant conferencing 318d, media advance 318e, and a workgroup portal 318f. The communications broker 320 implements a context manager 320a, configuration unit 320b, telephony features 320c, reports/data storage 320d, as well as interworking services.

The priority profiles 316a provide for handling of a user's communications and initiating specified actions, such as voice calls, e-mails and instant messages. It allows the user to configure personal rules for each status such as "In the Office", "On Business Trip", or "On Vacation"; and allows use of information such as who is calling and the media type to determine an action. The action may include routing to a specific device, routing to the preferred device at the time, sending a notification, and/or logging the transaction as will be discussed in more detail below.

The presence application 316d functions as a contact list control unit and allows, through the use of the contact lists, monitoring the status of contacts (e.g., "In the Office," "On Vacation," "Working Remote," etc.); and monitoring the "aggregated presence by media type" for each contact (i.e., whether the contact is accessible by phone, IM, or email).

The Word web 316b provides a Microsoft Word-based scripting for development of telephony applications. The self service portal 316c provides guest access to messaging, calendaring, and document retrieval features, such as Voicemail Functions—leave a message, transfer from voicemail; Calendar Functions—schedule/cancel/modify appointments with a subscriber, get email confirmation; and Document Access Functions—authenticate user based on PIN and allow reading, email or fax-back of documents stored in Exchange folders. The voice portal 316e provides user access to groupware features via the telephone. These can include, for example, Calendar Access functions—accept/decline/modify appointments, block out time; voicemail, email access functions—Inbox access with message sorting options (List total, retrieve (listen), skip, forward, reply, etc.).

In general, default user rules and actions are provided by the system users to specify custom rules and actions using the Personal Productivity Portal 316f, e.g., an interface to a client browser. During runtime, users can set their Presence State or specify a Preferred Device using either the Personal Productivity Portal 316f or the Voice Portal 316d.

The Workgroup Collaboration Portal 318f, which may be implemented as a browser interface, allows users to initiate audio or multi-media conferencing sessions and view documents that have been checked in to the Workgroup Repository (not shown). The audio conferencing module 318a and the multimedia conferencing module 318b allow the user to set up audio or multimedia conference sessions. The Instant Conference module 318d launches an audio or WebEx multimedia conferencing session, based on contact lists or address book(s). The Touch Conference module 318c allows the user to see the participant list and their presence status. The Media Advance module 318e offers users the point and click option to advance an existing audio conference to a multimedia collaborative session.

The communications broker 320 provides various communication services. The Context Manager 320a provides user presence/availability states for users, such as "In the Office", "On Vacation", "Working Remote", etc.; and provides device presence and device context for both SIP registered devices and user defined non-SIP devices. In addition, the context manager 320a provides, across the set of devices for a user, aggregated presence by media type, e.g., voice, IM, and email. For example, if a user is accessible by any phone device such as an office phone, a home phone, or a mobile phone; the aggregated presence for the user would indicate accessibility via the media type "telephone". Based on the aggregated presence information for each media type (e.g., available via telephone, not available via IM, available via email), others can choose the best medium of making contact with this user.

The telephony features 320c give applications access to connection management features via CSTA (computer-supported telecommunications applications) (e.g. make a call, transfer call, set-up conference, etc.) and provide address translation from dialing digits to SIP URL to broker connectivity between telephony devices and soft clients. The Interworking Services provide SIP gateway interworking (e.g., interworking with PSTN and PBX networks). Reports Data Storage 320d provides a repository for system and data reports.

The Context Manager 320a is a service that ties together a view of all users. This view may include the presence and availability of users, the state of users (e.g., in a voice call), each user's collaboration session associations, etc. The result is a detailed view of what the user and their devices are doing at any point in time. This information is used by other network users and system components to make decisions about how to contact the user.

It is noted that, while a presence server in a unified messaging system is shown, the teachings of the present invention are equally applicable to a presence system associated with a single medium, such as Instant Messaging. Thus, the figures are exemplary only.

Figure 4:
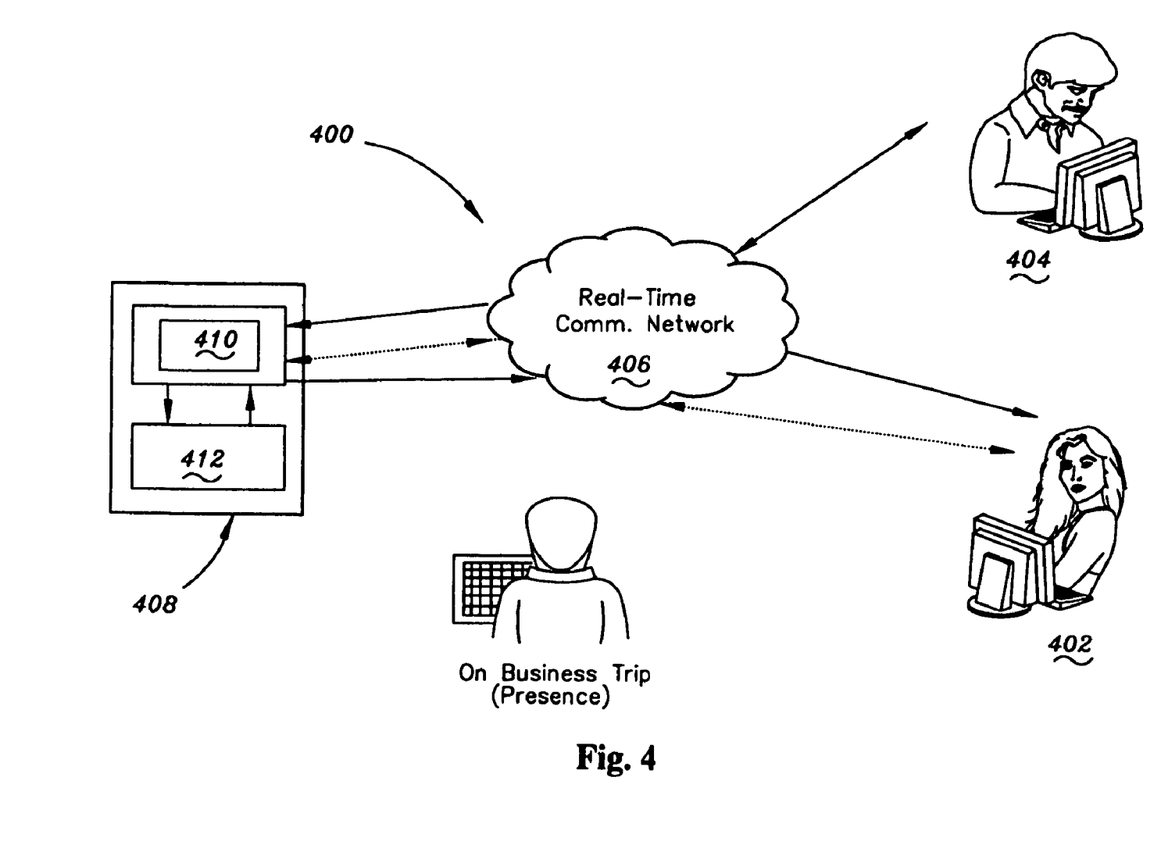
FIG. 4 shows a call urgency screening system operation in embodiments of the present invention.

With reference to FIG. 4, one implementation of a call urgency screening system in an embodiment of the present invention is shown. Call urgency screening system 400 is described with the following example. Jane 402 has her presence status set to "On business trip" as described in detail above. Therefore to all other users it will appear as if Jane 402 is not in the office. Jack 404 is interacting with network 200, which has access to presence based telecommunications system 100, and can see on his computer that Jane's presence is set to "On Business Trip". This presence state is available to Jack 404 because he has been set as a "Team Member" in Jane's contact list. Other system users not explicitly identified receive a presence state of "Unavailable". Furthermore, embodiments of the present invention disclose a way for the presence state communicated for an individual can be set to different values for specific recipients of that presence information. It is noted that a user has the ability to select certain individual(s) or group(s) of contacts to present their presence differently then to others. This can be controlled by rules or other presence influencing parameters. So, for example a user might want to indicate to their direct reports and their manager to be available even though they are "busy" in a meeting which is the presence indication to other users. This may not only influence their presence status seen by other users, but can also influence the real-time communication handling when others try to reach the user. The handling of the incoming communication may in this case get handled differently for the user's direct reports and manager versus other users.

Jack 404 is dealing with an important and urgent matter and needs to talk with Jane 402 so Jack 404 chooses to call Jane 402. Upon receiving Jack's call Jane's virtual assistant 408 answers the call. Virtual assistant 408 could be located on server 204. Dialogue engine 410 initiates a conversation with Jack 404 to ascertain the importance and the urgency of the call. The communication with Jack 404 could be by email, IM, SMS, pop-up display message or similar visual indication, or by voice using text to speech software. In its simplistic form, dialog engine 410 prompts Jack 404 to specify whether the call is urgent. Dialogue engine 410 can also prompt Jack 404 to specify the matter of the urgency, and perform a search of specific keywords in rules 412 specified by Jane 402 as important. Alternatively, dialog engine 410 can engage Jane 402 with an IM (instant messaging) session thus allowing Jane 402 to intervene and influence the routing of the call. Jane 402 could also engage in inter-media dialogue such as IM to Voice and vice-versa, with Jack 404 to understand the nature of the call. After ascertaining the nature of the call, the call is routed based on rules 412 or the preference specified by Jane 402 in real-time. Rules, for the purpose of this disclosure, will take the real-time presence information of, for example, other users that have been assigned by the user as their delegates, user location & time-zone, device/media capability, calendar context and other user definable conditions in consideration to determine what options are being offered to the caller and how to most effectively deal with the call for further processing/routing. The call can be routed back to Jane's assistant 408 to be placed in voicemail based on Jane's rules 412 or instructions.

Figure 5:
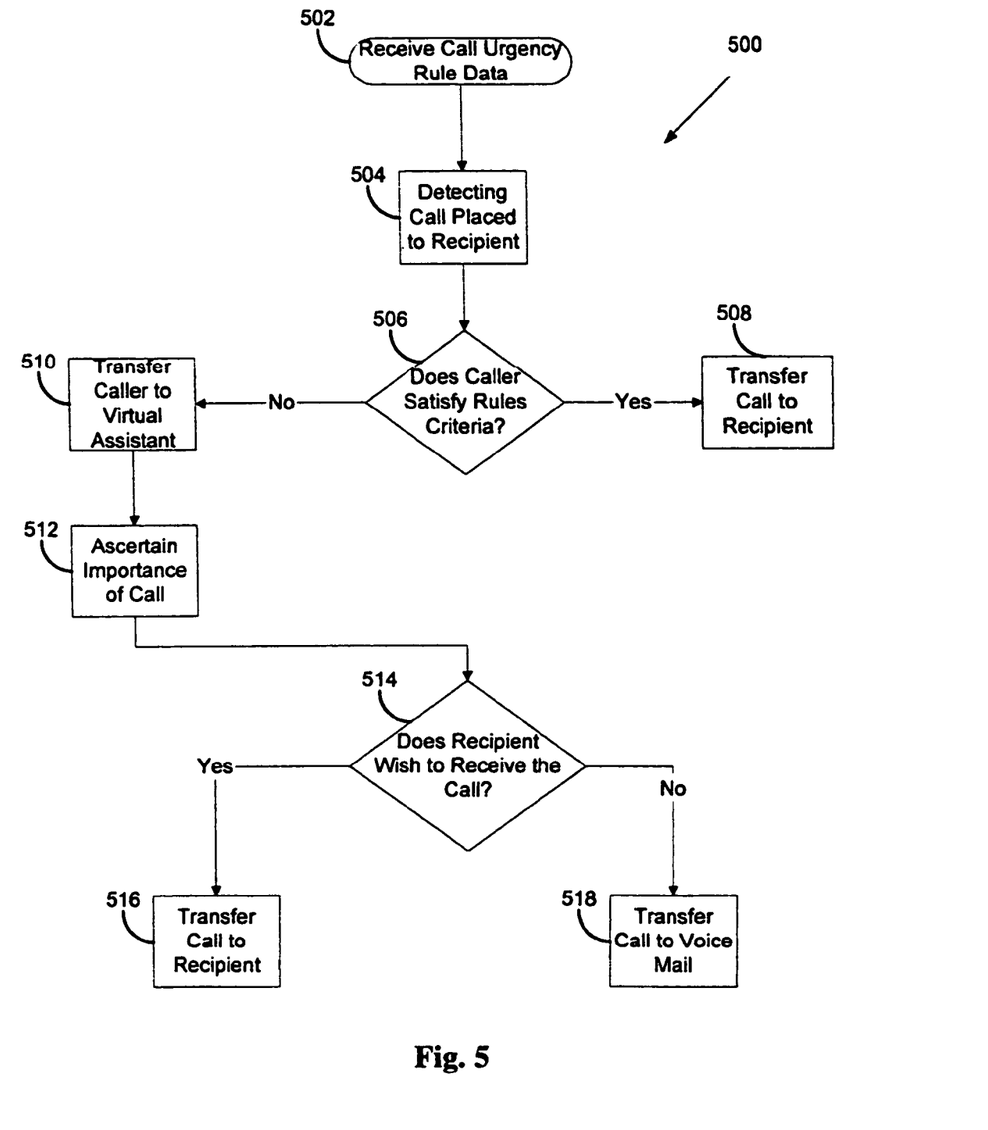
FIG. 5 is a flow chart diagram of a call urgency screening system according to embodiments of the present invention.

With reference to FIG. 5, a flow chart diagram of a call urgency screening system according to embodiments of the present invention is shown. It is fully contemplated that other implementations of a call urgency system 400 could be implemented without departing from the spirit of the invention. At state 502 a user such as Jack 404 or Jane 402 would input their call handling rules 412 that are received by virtual assistant 408. These preferences could include a list of phone numbers which can be passed through regardless of the recipient's presence information, a list of phone numbers or other means of identifying the caller that can be passed though based upon the recipient's presence information, and a list of phone numbers which are not passed to the recipient at all and is automatically sent into voice mail. Inside rules 412 user can also set how the recipient will interact with assistant 408 and/or the caller. For example, the recipient could instruct dialogue engine 410 to obtain call importance information directly from the caller. Dialog engine 410 can be set up to prompt the caller to specify the context of the call and then perform a search of specific keywords stored in rules 412 specified by the recipient as important. Dialog engine 410 can engage the recipient with an IM session to ask the recipient where to route the call. Dialog engine could allow the recipient to have an intermedia dialog via IM, IM to voice, and/or Voice to IM with the caller to determine the nature of the call.

At state 504, program 500 detects that a call has been placed to the recipient. At state 506 program 500 determines if the caller satisfies initial criteria for receipt of the call. If the caller can be routed through to the recipient, then they are at state 508. If a caller is not on the caller's list of people to be let though due to presence condition or otherwise, the caller is transferred to virtual assistant 410 at state 510. Dialog engine 408 can then ascertain the importance of the call in any one of the ways discussed in detail above. Dialog engine 410 can then determine if the recipient wishes to receive the call or offer the caller alternate call handling at state 514. If the recipient does wish to receive the call, then the caller is transfer to the recipient at state 516. If the recipient does not wish to receive the call, then the caller is transferred to voicemail or other options based on presence and rules such as connecting to one of the user's delegates, or set a callback. Further, dialog engine 410 can record the voicemail as well.

Figure 6:
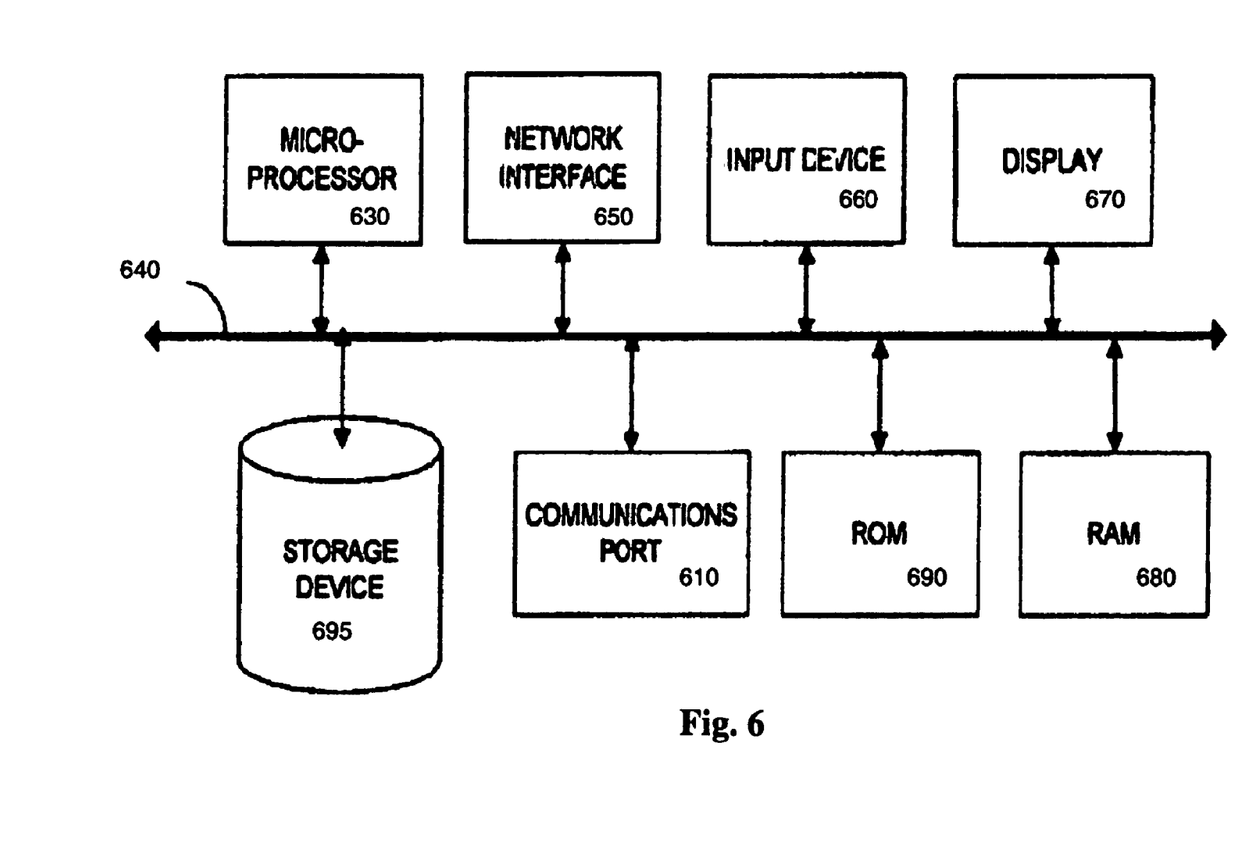
FIG. 6 is a block diagram of the internal architecture of a computing device according to some embodiments of the invention.

FIG. 6 is a representative block diagram of a computing device according to some embodiments. It is understood computing device 204 could be used to execute program 500 described above. Computing device 204 may comprise a single device or computer, a networked set or group of devices or computers, such as a workstation, laptop etc. Computing device 204 is typical of a data session-capable machine. Computing device 204 can include a microprocessor 630 in communication with communication bus 640. Microprocessor 630 is used to execute processor-executable process steps so as to control the components computing device 204 to provide functionality according to embodiments of the present invention. Microprocessor 630 may comprise a Pentium™, or Itanium™ microprocessor manufactured by Intel™ Corporation. Other suitable processors may be available from Motorola™, Inc., AMD™, or Sun Microsystems™, Inc. Microprocessor 630 also may comprise one or more microprocessors, controllers, memories, caches and the like.

Input device 660 and display 670 are also in communication with communication bus 640. Any known input device may be used as input device 660, including a keyboard, mouse, touch pad, voice-recognition system, or any combination of these devices. Input device 660 may be used by a user to input information and commands and select a destination party (parties) to initiate instant messaging.

Display 670 may be an integral or separate CRT display, a flat-panel display or the like. Display 670 is generally used to output graphics and text to an operator in response to commands issued by microprocessor 630. Display 670 may display presentation data and the like which is used during the call urgency screening.

RAM (Random Access Memory) 680 is connected to communication bus 640 to provide microprocessor 630 with fast data storage and retrieval. In this regard, processor-executable process steps being executed by microprocessor 630 are typically stored temporarily in RAM 680 and executed therefrom by microprocessor 630. ROM (Read Only Memory) 690, in contrast, may provide storage from which data can be retrieved but to which data cannot be stored. Accordingly, ROM 690 may be used to store invariant process steps and other data, such as basic input/output instructions and data used during system boot-up or to control input device 660. One or both of RAM 680 and ROM 690 may communicate directly with microprocessor 630 instead of over communication bus 640, or on separate dedicated busses.

Data storage device 695 stores, among other data, processor-executable process steps of call urgency screening program 500 discussed with respect to FIGS. 4 and 5. The process steps and program code of program 500 and the like may be read from a computer-readable medium, such as a floppy disk, a CD-ROM, a DVD-ROM, a Zip™ disk, a magnetic tape, or a signal encoding the process steps/program code, and then stored in data storage device 695 in a raw, compressed, un-compiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 650 which may be a wired or wireless Ethernet interface, a modem interface, and so on. In utilizing the various embodiments of the invention, the network interface 650 may be connected to or to provide or access a high-speed connection to the Internet or an Intranet providing access to the Internet or similar networks. Using such a network or networks, computing device 204 can communicate identifiers of destination parties to a mobile application server.

Stored in data storage device 695 may also be other elements that may be necessary for operation of computing device 204, such as other applications, other data files, a network server, an operating system, a database management system and "device drivers" for allowing microprocessor 630 to interface with external devices. These elements are known to those skilled in the art, and are therefore not described in detail herein.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for call urgency screening comprising:
a server receiving a presence status of a user;
the server receiving call handling rules from a computing device of the user, the call handling rules being based on the presence status of the user;
the server detecting a communication request for establishing a communication connection between the user and a caller for forming a communication;
the server determining whether to provide the presence status of the user to the caller based on an identity of the caller;
if the presence status of the user is provided to the caller, the server determining whether to effect the requested communication connection between the user and the caller based on the call handling rules;
if the caller satisfies the call handling rules:
the server effecting a connection of the requested communication connection between the user and the caller;
if the caller does not satisfy the call handling rules:
the server prompting the caller to provide subject matter information about a subject matter of the requested communication connection, the server storing the subject matter information provided by the caller;
the server determining if the user wants to receive the communication based on the stored subject matter information provided by the caller,
if the user wants to receive the communication, the server forwarding the communication to the user to effect the connection of the requested communication connection between the user and the caller, and
if the user does not want to receive the communication, the server forgoing forwarding of the communication to the user.

2. The method of claim 1, wherein if the caller does not satisfy the call handling rules the server determining if the user wants to receive the communication comprises the server initiating a real-time communication or a messaging communication via at least one communication device of the user to obtain input from the user for use in routing the requested communication connection.

3. The method of claim 2 further comprising the user providing input to the server specifying to the server a preference for routing the communication in response to the server initiating the real-time communication or the messaging communication with the user, and the server routing the requested communication connection according to the preference specified by the user in the input the user provided to the server.

4. The method of claim 1 wherein if the caller does not satisfy the call handling rules, the server determining if the user wants to receive the requested communication connection based on the stored subject matter information provided by the caller comprises the server performing a search of keywords on the subject matter information provided by the caller about the subject matter of the requested communication connection.

5. The method of claim 1, further comprising the server monitoring a presence status of the caller and wherein the call handling rules are also based on the presence status of the caller.

6. The method of claim 1, wherein the call handling rules comprise a first list of identification information associated with at least one first caller such that the at least one first caller of the first list is connectable to the user regardless of the presence status of the user, a second list of identification information associated with at least one second caller such that the at least one second caller of the second list is connectable to the user based upon the presence status of the user, and a third list of identification information associated with at least one third caller such that the at least one third caller of the third list is not connected to the user regardless of the presence status of the user and is automatically sent to a voicemail system.

7. The method of claim 1, wherein if the presence status of the user is provided to the caller, said presence status provided to said caller being a presence status that is adjusted based upon the identity of the caller in accordance with predefined presence status rules set by the user.

8. The method of claim 1, wherein if the presence status of the user is not provided to the caller, the server providing a default presence status of the user to the caller, the default presence status being unavailable.

9. The method of claim 1 wherein if the user does not want to receive the communication, the method further comprising the server transferring the communication to a voicemail system, the server connecting the communication to a delegate of the user, or the server receiving a setting for a call-back from the caller.

10. The method of claim 1 wherein if the caller does not satisfy the call handling rules, prompting the caller to provide the subject matter information about the subject matter of the requested communication connection comprises the server initiating a dialogue with the caller to receive the information from the caller, the dialogue comprising a voice conversation, an Instant Message ("IM") session, a Short Message Service ("SMS") session, or an inter-media dialogue.

11. The method of claim 1 wherein if the caller does not satisfy the call handling rules and if the user wants to receive the communication, the method further comprising the user communicating with the caller to determine an importance of the communication, wherein the communicating with the caller being carried out via a real-time communication, a messaging communication, or an inter-media dialogue.

12. The method of claim 1 wherein the call handling rules are also based on a location of the user, a time zone of the user, device and media capability of the user, and calendar context of the user.

13. The method of claim 1 wherein the server prompting the caller to provide the subject matter information about the requested communication connection comprises a virtual assistant of the server prompting the caller to provide the information.

14. The method of claim 1 wherein if the user does not want to receive the communication, the method further comprising the server forwarding the requested communication connection based on the information provided by the caller to a predetermined device of the user and the server sending a notification to the user that the requested communication connection was routed to the predetermined device.

15. The method of claim 1 wherein the presence status of the user is one of in the office, on business trip, and on vacation.

16. The method of claim 1 wherein the requested communication connection comprises a voice communication, a video communication, a cellular communication, an email, an IM message, or a SMS.

17. The method of claim 1 wherein if the presence status of the user is provided to the caller, the presence status of the user is an aggregated presence status.

18. A system for call urgency screening comprising:
a server; and
a computing device of a user; and
the server receiving a presence status of the user; and
the server receiving call handling rules from the computing device of the user, the call handling rules being based on the presence status of the user; and
the server detecting a communication request for establishing a connection between the computing device of the user and a caller device of the caller for a communication; and
the server determining whether to provide the presence status of the user to the caller based on an identity of the caller; and
if the presence status of the user is provided to the caller, the server determining whether to connect the caller device to the computing device of the user based on the call handling rules; and
if the caller satisfies the call handling rules:
the server connecting the computing device and the caller device for the communication;
if the caller does not satisfy the call handling rules:
the server prompting the caller to provide subject matter information about a subject matter of the communication, the server storing the subject matter information provided by the caller;
the server determining if the user wants to receive the communication based on the stored information provided by the caller,
if the user wants to receive the communication, the server forwarding the communication to the user, and
if the user does not want to receive the communication, the server forgoing forwarding of the communication to the user.

19. The system of claim 18 wherein if the server determines that the caller does not satisfy the call handling rules, the server performing a search of keywords on the stored subject matter information provided by the caller about the subject matter of the communication to determine whether the user wants to receive the communication.

20. The device of claim 18 wherein if the caller does not satisfy the call handling rules, the server contacting the computing device of the user with a real-time communication or a messaging communication, the server receiving a preference from the user for routing the communication, and the server routing the communication according to the preference specified by the user.

* * * * *